INVENTOR.
ELIYAHU R. HAYON

United States Patent Office 3,335,698
Patented Aug. 15, 1967

3,335,698
PAN GREASING MACHINE
Eliyahu R. Hayon, 5 Shamai St., Jerusalem, Israel
Filed Jan. 16, 1964, Ser. No. 338,058
Claims priority, application Israel, Dec. 2, 1963, 20,355
1 Claim. (Cl. 118—73)

The present invention relates to a pan greasing machine particularly useful for greasing all kinds of baking pans and the like, but also useful in other applications.

Up to now the greasing or lubrication of baking pans was normally carried out manually with the aid of a spraying gun or the like. This manual operation is time-consuming. Moreover, a great quantity of grease is lost, and the premises, as well as the person of the operator, are soiled by the atomized grease. In addition, the grease vapors inhaled by the operator are very unpleasant and could even be detrimental to his health.

Machines for greasing pans have been devised but as a rule they are quite complicated and costly.

An object of the invention is to provide a pan greasing machine which avoids these disadvantages.

More particularly, it is an object of the invention to provide a pan greasing machine in which the greasing or oiling of the baking pans is carried out automatically in an enclosed space, from which space little vapors escape, and from which space the excess grease is returned to the grease supply. Thus, wastage of grease is avoided, the premises remain clean, and the operation of the machine requires only a minimum of time and manpower. In medium sized bakeries an economy of 50% in grease and 400% in manpower may be achieved with the new machine.

According to the invention, I provide a pan greasing machine particularly useful for greasing baking pans and the like, comprising a casing partitioned into an upper and lower chamber, the upper chamber being closed at the top and open at its front and rear sides, a grease spraying device located inside the upper chamber below its top and including a pipe having a plurality of spaced nozzles extending across the top of the upper chamber, a supporting board for baking pans and the like extending across the bottom of the upper chamber under the grease spraying device and projecting outwardly past said open front and rear sides of the upper chamber, the supporting board including a grid sloping downwardly from said front to said rear sides, a grease pump and a motor for driving the grease pump disposed inside the lower chamber, a first conduit leading from the grease pump to the grease spraying device, a second conduit leading from the grease pump to a grease supply, and a drain for returning excess grease from the supporting board to the grease supply.

Preferably, the machine further includes a compressed air cleaning device mounted along the top wall of the upper chamber between the grease spraying device and the front side of the chamber for cleaning the baking pans before they are greased.

Further objects and aspects of the invention will be apparent as the description proceeds.

The invention will now be described with reference to the accompanying drawings which illustrate, somewhat diagrammatically and by way of example only, a preferred embodiment of the invention. In the drawings.

Figure 1:
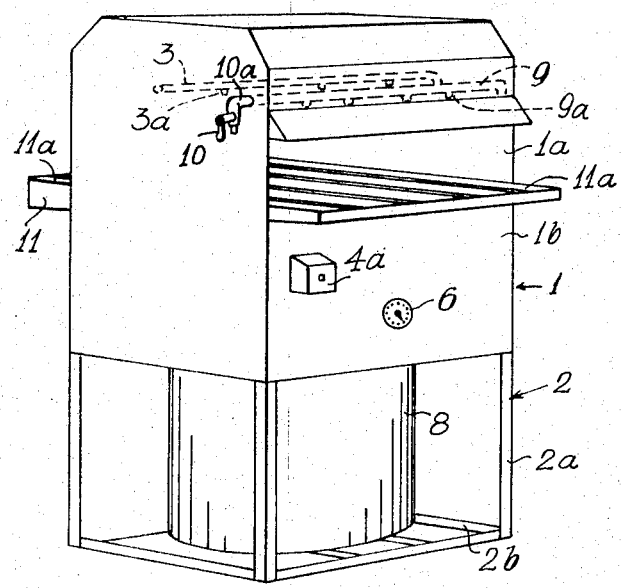
FIG. 1 is a perspective view of a pan greasing machine constructed in accordance with the invention.

The machine illustrated in the drawings is particularly useful for greasing or oiling baking pans. The machine comprises a substantially rectangular casing 1 supported on a frame 2 consisting essentially of four legs 2a and an open bottom 2b, the casing being partitioned horizontally into an upper chamber 1a and a lower chamber 1b. The upper chamber 1a is closed on top and bottom and is open at its front and rear sides. A grease spraying pipe 3 provided with a plurality of spaced nozzles 3a is disposed within the upper chamber 1a below the top and at a distance from the front side.

A baking pan supporting board 11 is located on the bottom of the upper chamber and slopes downwardly from the front side to the rear side of the casing and extends beyond both sides so that it projects outwardly from both the front and rear sides of the upper chamber. A grid 11a is positioned on board 11.

A grease pump 5 and a motor 4 for driving the pump are disposed within the lower chamber 1b. Beneath the lower chamber, and supported on the bottom frame structure 2b, is a grease container 8 serving as the supply of grease for the machine. A conduit 3b leads from grease pump 5 to the grease spraying pipe 3, and a second conduit 7 leads from pump 5 to grease container 8. The latter conduit preferably includes a grease filter 7a.

Grease pump 5 is connected to an oil pressure meter 6 mounted on the front side of the lower chamber 1b of casing 1. Motor 4 is controlled by an electric switch 4a which is likewise mounted on the front side of the lower chamber 1b.

The pan supporting board 11 is provided with a drain 12 for returning excess grease to grease container 8. Drain 12 may include a grease filter (not shown) for filtering the returned grease.

The machine further includes a pipe 9 provided with spaced nozzles 9a extending across the top of the upper chamber 1a. Pipe 9 is supplied with compressed air through inlet 10a controlled by inlet valve 10, the latter being mounted on the side wall of the upper chamber 1a. Pipe 9 and its nozzles 9a are used for cleaning the baking pans before they are greased by the greasing device, and therefore are positioned between the front of the upper chamber and the grease spraying device 3.

Figure 2:
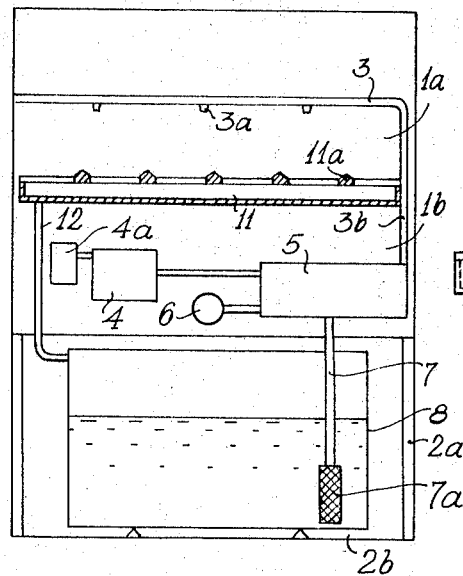
FIG. 2 is a diagrammatic view from the front, with several parts shown in section, primarily for purposes of illustrating the positions of the various elements wtihin the machine.
Figure 3:
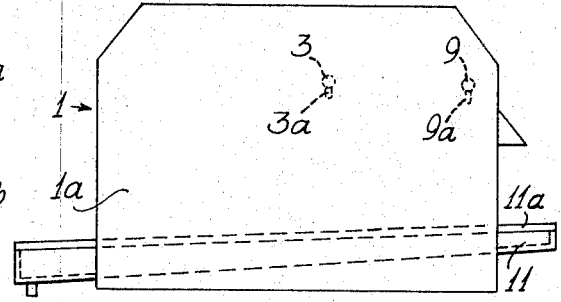
FIG. 3 is a fractional diagrammatic view from the side, further illustrating the positions of the various elements within the machine.

For purposes of clarity, the diagrammatic view of FIG. 2 is taken between the compressed air pipe 9 and the grease pipe 3, so as better to see the grease pipe 3 and its connections with the grease pump 5.

The operation of the machine is as follows: the baking pans to be greased are positioned on grid 11a of board 11, and if they are to be cleaned before greasing, the valve 10 for the compressed air supply is opened so that compressed air issues from nozzles 9a of pipe 9 onto the pan to clean it. Thereupon the motor is switched on by electrical switch 4a, and grease is pumped by pump 5 into the pipe 3 where it is sprayed through nozzles 3a onto the pan. During greasing, the pan slides on the sloping board 11 and exits from the rear side of the chamber 1a. Excess grease is returned by drain 12 to container 8.

It is to be understood that the described embodiment of the invention is illustrative only, and that many other embodiments, variations and applications of the invention, or the several features thereof disclosed, may be made without departing from the spirit or scope of the invention as defined in the following claim.

What is claimed is:

A pan greasing machine for greasing baking pans and the like, comprising, a casing defining an upper and a lower chamber, the upper chamber being closed at the top and open at its front and rear sides, a grease spraying device including a pipe having a plurality of spaced nozzles extending across the top of the upper chamber, a supporting board for baking pans and the like extending across the bottom of the upper chamber under said grease spraying device and projecting outwardly past said open front and rear sides of the upper chamber, said supporting board including a grid sloping downwardly from said front to said rear sides, a container adapted to hold grease, a grease pump, and a motor for driving said grease pump, a first conduit leading from said grease pump to said grease spraying device, a second conduit leading from said grease pump to the grease container, a drain for returning excess grease from said supporting board to said grease container, and a compressed air cleaning device disposed within the upper chamber below its top and between said grease spraying device and the front side of said chamber, said cleaning device comprising a compressed air pipe including a plurality of spaced nozzles extending across the top of the upper chamber between the grease spraying device and the front side of the upper chamber.

References Cited

UNITED STATES PATENTS

| | | |
|---|---|---|
| 1,029,733 | 6/1912 | Vollmer. |
| 1,993,154 | 3/1935 | Elkington _____ 134—165 X |
| 2,051,233 | 8/1936 | Webb _____ 134—98 |
| 2,439,808 | 4/1948 | Hodson _____ 118—326 X |
| 2,499,621 | 3/1950 | Archer. |
| 2,633,821 | 4/1953 | Koerber. |
| 2,643,636 | 5/1953 | Bauer. |
| 2,651,065 | 9/1953 | O'Connor _____ 15—56 |
| 2,666,439 | 1/1954 | Bechtol _____ 134—57 |
| 2,715,359 | 8/1955 | Mackingtosh _____ 118—326 X |
| 2,747,539 | 5/1956 | Peffer. |
| 2,772,657 | 12/1956 | Parker _____ 118—326 X |
| 3,020,917 | 2/1962 | Lyman _____ 134—99 X |
| 3,071,144 | 1/1963 | Hilliker _____ 134—46 |

FOREIGN PATENTS 3,194   2/1910   Great Britain.

CHARLES A. WILLMUTH, *Primary Examiner.*

D. BLUM, *Assistant Examiner.*